3,230,235
PEROXY AND HYDROPEROXY DERIVATIVES OF ROSIN ACIDS
Richard N. Moore, El Dorado, Ark., and Ray V. Lawrence and Walter H. Schuller, Lake City, Fla., assignors to the United States of America as represented by the Secretary of Agriculture
No Drawing. Filed July 3, 1961, Ser. No. 131,703
7 Claims. (Cl. 260—340.3)
(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of peroxides including hydroperoxides from rosin acids or neutralized rosin acids containing conjugated dienic groupings.

The peroxides produced in accordance with this invention are useful as catalysts for the same polymerization as described in application Serial No. 496,085 filed March 22, 1955, now Patent No. 2,775,578.

The process of this invention is carried out by passing an excess of a gas containing free oxygen through the rosin acid or neutralized rosin acid to which a sensitizing organic dye has been added, while illuminating the mixture with artificial light (incandescent or fluorescent) or sunlight.

Products produced by the direct, non-photochemically induced oxygen or air oxidation of the rosin acids are dark colored heterogeneous mixtures formed in low yield. No more than about ten mole percent concentration of rosin acid peroxide can be prepared by processes other than photochemically induced oxidation since at this concentration the rate of decomposition of the peroxide equals the rate of peroxide formation.

In accordance with this invention, carboxylic acids such as abietic acid, neoabietic acid, levopimaric acid, palustric acid, and the derivatives of these acids such as the esters and the salts, can be photochemically oxidized to produce, in high yield, compounds that contain active oxygen (peroxides).

The photochemical oxidation reaction of this invention is applicable to conjugated dienic rosin acids, the esters of conjugated dienic rosin acids, and the salts of conjugated dienic rosin acids. Moreover, since the carboxyl group does not enter into the oxidation reaction or affect the oxidation reaction in any way except to the extent that the ability of the carboxyl grouping to form soluble derivatives can influence the choice of the solvent to be employed, when use of a solvent is dictated by the physical characteristics of the starting material (i.e. starting material a solid at the temperature selected for the photochemical oxidation reaction), the process of this invention is applicable to any compound that contains a reactive conjugated diene grouping. Neoabietinol, levopimarinol or the corresponding hydrocarbon compounds, for example, can be photochemically oxidized with equivalent results by this process.

Satisfactory solvents for use in the practice of this invention, where use of a solvent is indicated, are water, alcohols, ketones or any polar or semi-polar solvent for the conjugated dienic material being subjected to photochemical oxidation.

When use of a solvent is indicated for the photochemical oxidation process of this invention, the solvent in addition to possessing good solvent power for the conjugated dienic material, must transmit the active wavelengths of light which are from about 2000 to 7000 A. and be inert toward the conjugated dienic material and the active oxygen compounds produced by the process.

The temperature at which the photochemical oxidation process of this invention is to be carried out can be room temperature (20–30° C.) or within a somewhat broader range, e.g. 10–45° C. The operational temperature of the process is largely a matter of convenience. Photochemical oxidation processes are accelerated only to a slight degree by an increase in temperature. However, high temperatures should be avoided to prevent undesirable side and secondary reactions which are accelerated by increases in temperature.

Temperatures higher than room temperature can be employed for operational convenience if the pH of the reaction is kept at or near to pH 7, but as indicated above, the yield of active oxygen product will be less at the higher temperatures due to side and secondary reactions.

The pH at which the photochemical oxidation is best carried out is pH 7 or below since the oxidation reaction is more rapid at lower pH and furthermore secondary reactions are induced by an excess of alkali. The stability of the conjugated dienic material undergoing photochemical oxidation must, of course, be considered when choosing the optimum pH for a particular reaction. In the case of levopimaric acid, excessive amounts of mineral acid are not desirable because isomerization reactions may be induced. Also, as shown in Example 7 below, the photochemical oxidation of the alkali metal salts of levopimaric acid in the presence of an excess of alkali leads to a base catalyzed rearrangement of the peroxide salt, as described in our co-application.

The rate of oxidation is basically limited by the intensity and characteristics of the light source, and is independent of the concentration of the rosin acids over a wide range of concentration. No increase in oxidation rate is obtained by employing very high rosin acid concentrations, but side reactions become competitive with the oxidation reaction and some reduction in yield of peroxides results. Dilute solutions will therefore be commonly employed in the practice of this invention. Low rosin acid concentrations may be maintained by addition of the rosin acids at a suitable rate to the solution as the reaction progresses, so that the final product is quite concentrated with respect to peroxides.

Any gas that contains free oxygen and is of itself inert under the conditions of the photochemical oxidation reaction can be used to carry out the process of this invention. It is essential that an excess of oxygen be kept dissolved in the reaction mixture during the photochemical oxidation process in order to prevent undesirable side reactions such as photochemical isomerization, the latter brought about by a deficiency of oxygen during the process operation. Any efficient method of agitation such as stirring or bubbling the oxygen containing gas through the reaction mixture can be used to maintain an excess of oxygen gas dissolved in the reaction mixture. Because it is desirable to maintain an excess of oxygen in the reaction mixture there is some advantage in the use of pure oxygen and in the use of pressures greater than atmospheric for carrying out this reaction.

The choice of the material to be used as a photo-sensitizer for the photochemical oxidation reaction depends in large measure on the other reaction variables, the spectral characteristics and intensity of the light being used, the light transmission characteristics of the reaction mixture and the reaction container and the quantum efficiency of the photosensitizer.

The choice of concentration of the photosensitizer is dictated by the same variables plus its own transmittancy of active light wavelengths and the dimensions of the reaction vessel. The concentration of the photosensitizer can be adjusted along with the other variables to achieve the most economical compromise between the use of light and of photosensitizer material. The following photosensitizers have been found to function satisfactorily under the conditions described: rose bengal, methylene blue, erythrosin, eosin, retene quinone, 1,2-napthoquinone, chlorophyll, and fluorescein.

The photosensitized oxidation of heteroannular conjugated dienes has been previously reported to be specifically limited to cisoid dienes [D. H. R. Barton and G. F. Laws, J. Chem. Soc., 52 (1954)]. The present work, especially the photosensitized oxidation of neoabietic acid and abietic acid, constitutes the first demonstration of the photosensitized oxidation of a *transoid* conjugated diene. [See W. H. Schuller and R. V. Lawrence, Chemistry & Industry, 105–106 (1961).] This is a new finding of considerable scope, utility, and importance. The structure of the product from the photosensitized oxidation of neoabietic acid and abietic acid could not have been predicted from a knowledge of all the prior literature and the results obtained from this reaction were entirely unexpected. The structure of the diperoxide from neoabietic acid, for example, clearly is an exception to the teaching held until this time (e.g. see Tobolsky et al.) that a parallelism always exists between the structure of the maleic anhydride adduct and the structure of the peroxide formed on photosensitized oxidation. The reaction of all four resin acids (levopimaric, neoabietic, palustric, and abietic) with maleic anhydride yields the same product, namely, maleopimaric acid, which is a 6,14-adduct of maleic anhydride. The structure of neoabietic acid diperoxide, abietic acid diperoxide, and palustric peroxide as described herein, clearly demonstrate that no parallelism exists in these cases, between the addition of maleic anhydride and the photosensitized addition of oxygen.

The new compound, neoabietic acid diperoxide, (18-hydroperoxy-6,14-peroxy - $\Delta^{7,8}$ - dihydroabietic acid) has been found useful in conjunction with certain accelerators, in the room temperature curing of polymer systems such as the styrenated polyester type laminating resins commonly employed in the manufacture of boats and so forth. The compound is also useful in the two stage curing of certain polymer systems (e.g. casting resins) as the two peroxide groups decompose thermally at different temperatures.

The compound from the bisulfite reduction of the hydroperoxy group to a hydroxy group in neodiperoxide, (18-hydroxy-6,14-peroxy-$\Delta^{7,8}$-dihydroabietic acid) is also useful as an initiator for the polymerization of vinyl monomers as are levopimaric acid transannular peroxide, palustric acid transannular peroxide, the crude peroxidic mixture from the photosensitized oxidation of gum rosin, the crude peroxide from the photosensitized oxidation of pine gum, and the product (18-hydroperoxy-6-keto-14-hydroxy-$\Delta^{7,8}$-dihydroabietic acid) obtained by the treatment of neoabietic acid diperoxide with base.

The following examples illustrate the process of photochemically oxidizing carboxylic acids and derivatives of carboxylic acids that contain a conjugated dienic grouping to produce active oxygen compounds.

EXAMPLE 1

A cylindrical Pyrex vessel containing 15.1 g. of levopimaric acid, 2.0 g. of sodium hydroxide, 0.0225 g. of eosin, and sufficient 95% alcohol to produce 450 ml. of solution was irradiated by a 15 watt fluorescent lamp while a stream of oxygen was passed through the solution at a rate sufficient to keep the solution saturated with respect to oxygen. The optical rotation of the solution changed from $[\alpha]_D$ —276° to $[\alpha]_D$ +67° in 42 hours based on the original concentration of levopimaric acid. The peroxide,

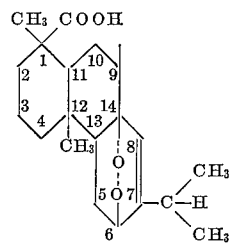

was isolated essentially free of the sensitizer and in a high state of purity by removing most of the alcohol by vacuum distillation, and treating the pot residue with 200 ml. of acetone, and filtering out the precipitated sodium salt of the peroxide. The recovery of the purified salt of the peroxide was 11.60 g. or 65% of the theoretical yield. The salt was dissolved in a little alcohol and acidified with dilute acetic acid. The free rosin acid peroxide crystallized when the alcohol was diluted with a little water. After recrystallization once from aqueous alcohol the peroxide melted at 152–154° C. and weighed 7.43 g. The numbering in the structural formula is according to Simonsen, "The Terpenes," Vol. III, page 374 (Second Edition, at University Press, Cambridge, England).

EXAMPLE 2

A crude sample of levopimaric acid photoperoxide obtained under oxidation conditions similar to those described under Example 1, was purified by precipitation from alcohol solution with 2-amino-2-methyl-1-propanol. The precipitate was white after two recrystallizations from ethanol and had a specific optical rotation of +77.1° (1% in ethanol). The amine addition compound was slurried in ether and acidified with dilute acetic acid. The ether layer was separated, washed several times with water, dried over anhydrous sodium sulfate and filtered. The ether was then evaporated from the filtrate and the residue was recrystallized once from alcohol-water. The peroxide purified in this manner melted at 158–159° C., had a neutral equivalent of 334 and a specific optical rotation of +101° (1% in alcohol). Analysis for carbon and hydrogen content was in good agreement with the calculated values for an intramolecular peroxide of formula $C_{20}H_{30}O_4$. The peroxide when treated with methyl magnesium iodide, liberated 1 mole of methane per neutral equivalent and therefore contained no active hydrogen other than the one present in the carboxyl group.

EXAMPLE 3

A sample of levopimaric acid photo peroxide from Example 2 was dissolved in ether and treated with a slight excess of diazomethane. The methyl ester of the peroxide readily crystallized after removal of the solvent under vacuum, and melted at 100–101° C. after recrystallization from aqueous alcohol. It had $[\alpha]_D$ +93.5° (2% in alcohol) and its carbon and hydrogen content was found by analysis to be in good agreement with an empirical formula of $C_{21}H_{32}O_4$. The infrared absorption spectrum of the methyl ester showed no characteristic O—H stretching band in the region of 3 microns.

EXAMPLE 4

A solution containing 0.604 g. of methyl levopimarate ($[\alpha]_D$ −270°, $>^{alc.}_{max.}$ 272 millimicrons $\alpha$ 18)

and 5 mg. of eosin in 100 ml. of 95% ethanol in a 1 by 10 inch test tube was aerated with air presaturated with alcohol and irradiated by a 15 watt fluorescent lamp. After 10 hours reaction the $[\alpha]_D$ was constant at +83° (based on the charged weight). The oxidation was quantitative since the ultraviolet absorption spectrum showed no characteristic absorption between 220 and 320 millimicrons. The alcoholic product solution was diluted with a large volume of water and extracted with ether. The ether extract was dried over anhydrous sodium sulfate, filtered and the ether was removed by distillation. The residue (0.62 g.) melted at 96–98° C. after two recrystallizations from alcohol-water. The melting point was not depressed when the ester was admixed with an equal amount of the ester obtained under Example 3.

EXAMPLE 5

A solution containing 28.0 g. of levopimaric acid and 0.28 g. eosin in 2.8 liters of 95% ethanol was charged to an oxidation vessel consisting of concentric tubes, the outer tube being 7.5 by 125 cm. with a sintered glass bottom, and the inner tube being 4.5 by 130 cm. and containing a 40 watt fluorescent lamp. A vigorous stream of air bubbles was passed through the alcoholic solution and the fluorescent light was turned on. After two hours the ultraviolet spectrum showed that only 34% of the levopimaric acid remained unoxidized. This amounts to a conversion of 231 g. of levopimaric acid per kilowatt hour of power.

EXAMPLE 6

In order to study the variables affecting the photochemical oxidation of the abietic type resin acids, a set of four cylindrical Pyrex test tubes of 2.8 cm. outside diameter and 25 cm. long was obtained. The tubes were fitted with reflux condensers and a sintered glass pencil type gas inlet near the bottom of each tube. Each tube was masked with opaque paper so that only a cylindrical center section 140 mm. long was exposed to light. Photochemical oxidation in quadruplicate, of alcoholic solutions of 0.02 molar levopimaric acid sensitized by 50 mg. of eosin per liter gave a maximum difference in observed optical rotation of 0.07° during the reaction. When no sensitizer was employed, the optical rotation of the levopimaric acid remained unchanged during 14 hours of irradiation and aeration. When the concentration of eosin was increased from 50 mg. per liter to 100 mg. per liter, the rate of change in $[\alpha]_D$ was increased from 52.2° per hour to 59.4° per hour.

EXAMPLE 7

Four 100 ml. solutions in 95% ethanol each containing 0.002 mole of levopimaric acid and 5 mg. of eosin and containing also in (1) 0.000 mole of NaOH, in (2) 0.001 mole of NaOH, in (3) 0.002 mole of NaOH, and in (4) 0.003 mole of NaOH, were prepared and placed in the four test tubes described under Example 6. The tubes were irradiated by a 15 watt fluorescent lamp while a stream of gaseous $O_2$ was bubbled through. The changes in the optical rotations of the first three tubes showed that the reaction was not altered by addition of up to 1 equivalent of NaOH per equivalent of levopimaric acid. The reaction in tube (4) was altered by the presence of excess NaOH, as further described in the aforementioned Serial #2,899,463.

EXAMPLE 8

A number of oxidations were conducted using 100 ml. of solution in 95% ethanol containing 0.002 mole of levopimaric acid and various sensitizers. The reactions were conducted in the tubes described in Example 6 and a 15 watt fluorescent lamp was employed as a light source. The oxidation was found to be sensitized by rose bengal, methylene blue, erythrosin, eosin, retene quinone, 1,2-napthoquinone, alcohol soluble chlorophyll and fluorescein. No reaction occurred in the absence of sensitizer.

EXAMPLE 9

A solution of 8.16 g. of neoabietic acid and 0.135 g. of erythrosin B (0.01 M in resin acid and 50 mg./l. in dye) in 2700 ml. of 95% ethanol was charged to the reactor described in Example 5 above. The reaction was followed by the change in $[\alpha]_D^t$ and was well over in 2 hr. (no change in specific rotation on further aeration and irradiation). The solution was stripped under reduced pressure to about 100 ml., chilled in an ice bath, and 3.35 ml. of freshly distilled cyclohexylamine added slowly with stirring and cooling; final pH 9. On standing, the crystalline salt slowly appeared. It was collected by filtration, washed thoroughly with pentane and dried over Drierite, yield 8.64 g. (69%). The salt was dissolved in 95% ethanol (containing a few drops of cyclohexylamine) at about 50 to 60° and on cooling a first crop, 2.83 g. and a second crop, 2.33 g. were obtained, both of the same rotation; $[\alpha]_D^{25}$ +72.2° (c.=0.476), rotation unchanged on further recrystallization. The pure salt exhibited M.P.181–181.5° with dec. and evolution of gas; no characteristic absorption from 220–320 m$\mu$; $\lambda_{max}$ (Nujol mull) 2.95$\mu$ (s), 6.20$\mu$ (s), 8.78$\mu$(s), no band in 5.8$\mu$ region.

*Analysis.*—Calcd. for $C_{26}H_{43}NO_6$: C, 67.1; H, 9.3; N, 3.0; neut. equiv., 466. Found: C, 67.3, 67.3; H, 9.4, 9.4; N, 3.0, 3.0; neut. equiv., 467.

The cyclohexylamine salt of 18 - hydroperoxy-6,14-peroxy-$\Delta$7(8)-dihydroabietic acid (2.55 g.) was suspended in ether and shaken with dilute aqueous phosphoric acid (1 mole phosphoric acid/1 mole salt). The ether layer required only two water washings to be free of mineral acid. Evaporation of the ether gave 2.03 g. (80%) of the free acid which was crystallized from aqueous methanol, yield 1.77 g. of needles; $[\alpha]_D^{27}$ +91.7° (c.=1.0). Recrystallization from aqueous methanol gave star clusters, yield 0.67 g.; $[\alpha]_D^{27}$ +94.4° (c.=1.08), rotation unchanged on further recrystallization; M.P. 176° C. with dec. and evolution of gas; no characteristic absorption from 220–320 m$\mu$; $\lambda_{max}$ (Nujol mull) 3.02$\mu$ (s), 5.92$\mu$ (s), 8.81$\mu$ (s), no bands in the 6.05$\mu$ region and no strong bands in the 11 to 12$\mu$ region; $\lambda_{max}$ (CHCl$_3$) 2.85$\mu$ (s), 5.92$\mu$ (s).

*Analysis.*—Calcd. for $C_{20}H_{30}O_6$: C, 65.6; H, 8.3; neut. equiv., 366. Found: C, 65.6, 65.6; H, 8.5, 8.6; neut. equiv., 368.

*Peroxide analyses[a] of related compounds for varying reaction periods with reagent*

| Reaction period in dark, min. | Moles of titratable peroxide/mole of peroxide compound | | | |
|---|---|---|---|---|
| | NeOP[b] | NeOP·CH[c] | LAP[d] | Difference[e] (NeOP-LAP) |
| 5 | 1.13 | 1.05 | 0.43 | 0.73 |
| 10 | 1.31 | 1.25 | 0.56 | 0.78 |
| 30 | 1.50 | 1.44 | 0.68 | 0.82 |
| 60 | 1.49 | 1.39 | 0.75 | 0.78 |
| 240 | 1.58 | 1.54 | 0.77 | 0.81 |

[a] Peroxide analyses via the modified Wheeler method. [G. S. Fisher, J. S. Stinson, and L. A. Goldblatt, J. Am. Chem. Soc., 75, 3675 (1953).]
[b] 18-hydroperoxy-6,14-peroxy-$\Delta$ 7(8)-dihydroabietic acid.
[c] Cyclohexylamine salt of 18-hydroperoxy-6,14-peroxy-$\Delta$ 7(8)-dihydroabietic acid.
[d] 6,14-peroxy-$\Delta$7(8)-dihydroabietic acid.
[e] The results for NeOP and LAP were plotted as a function of time and the values taken from the plots used in calculating the difference, NeOP-LAP.

Methyl 18-hydroperoxy-6,14-peroxy-Δ7(8)-dihydroabietate was prepared using diazomethane in ether solution. The residue, after solvent stripping, was crystallized from methanol-water; yield 0.48 g. (81%); $[\alpha]_D^{25}$ +91.3° (c.=0.489). Recrystallization from methanol-water gave long needles; yield 0.33 g.; $[\alpha]_D^{29}$ +91.3° (c.=0.936), M.P. 147–147.5° with dec. and evolution of gas; no characteristic absorption from 220–320 m$\mu$; peroxide analysis (peroxide analysis via the modified Wheeler method, 1.0 hr. reaction period in the dark) 1.79 moles peroxide/mole of ester; $\lambda_{max}$ (Nujol mull 2.97$\mu$ (s), 5.81$\mu$ (s); $\lambda_{max}$ CCl$_4$) 2.83 (W), 2.93 (m), 5.79$\mu$ (s).

*Analysis.*—Calcd. for $C_{21}H_{32}O_6$: C, 66.3; H, 8.5. Found: C, 66.6, 66.6; H, 8.6, 8.5.

Based on the above evidence plus other data presented in Chem. and Ind. (London), 105 (1961), by W. H. Schuller and R. V. Lawrence, the structural formula of the diperoxide obtained from the photosensitized oxidation of neoabietic acid is

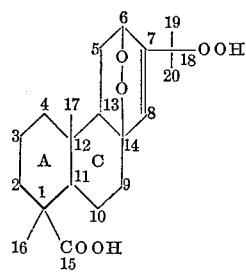

A comparison of the nuclear magnetic resonance spectra of the methyl esters of 18-hydroperoxy-6,14-peroxy-Δ7,8-dihydroabietic acid and 6,14-peroxy-Δ7(8)-dihydroabietic acid confirms the structure of the former compound to be as indicated. The liberation of acetone on the treatment of 18-hydroperoxy-6,14-peroxy-Δ7(8)-dihydroabietic acid with base and then with strong acid confirms the location of the hydroperoxide group on C–18 (see reference cited above). Again, the similarity of molar rotations of 18-hydroperoxy-6,14-peroxy-Δ7(8)-dihydroabietic acid ($M_D$ +346) and 6,14-peroxy-Δ7(8)-dihydroabietic acid ($M_D$ +338) confirms the structure of the former compound to be as indicated as the nonasymmetry of the C–18 carbon atom would result in little change in $M_D$ on replacement of the C–18 hydrogen with another group such as —OOH.

EXAMPLE 10

To 0.50 g. of 18-hydroperoxy-6,14-peroxy-Δ7(8)-dihydroabietic acid was added 2.08 ml. of 0.916 N sodium hydroxide (1.4/1 base/diperoxide) and diluted to 25.0 ml. with water. The specific rotation dropped rapidly from +94° to +21° in 24 min. with little further change to 75 min., at which time 0.64 ml. of 0.52 N acetic acid was added; final pH 5. A precipitate came down, yield, 0.25 g. (52%); $[\alpha]_D^{28}$ +41.9° (c.=0.989); $\lambda_{max}$ 234 m$\mu$, $\alpha$=9.3; peroxide content 0.54 mole peroxide/mole of hydroxy-ketone; $\lambda_{max}$ 2.95$\mu$ (s), 5.9$\mu$ (s), 6.04$\mu$ (s). This hydroperoxide has the structural formula

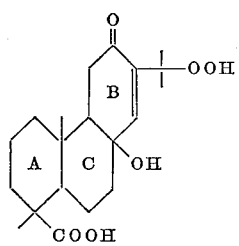

EXAMPLE 11

100 ml. of a solution containing 1.00 g. of commercial pine gum and 5 mg. of eosin in 95% ethanol was photochemically oxidized in the manner described in Example 6. Analysis of the oxidate after 25 hours reaction showed that it contained at least 1.94 milliequivalents of active oxygen. The actual active oxygen content must have been appreciably greater than was shown by analysis since the pine gum originally contained about 25% levopimaric acid which yields a peroxide which liberates less than one eq. of iodine per mole, under the analytical conditions.

EXAMPLE 12

100 ml. of a solution containing 1.00 g. of commercial WW grade gum rosin and 5 mg. of eosin in 95% ethanol was oxidized in the manner described in Example 6. Analysis of the solution after 24 hours reaction showed it to contain at least 2.06 milliequivalents of active oxygen. Assuming the average molecular weight of rosin to be 302, this would equal 0.62 atom of oxygen per molecule.

EXAMPLE 13

A solution of 0.604 g. of pure abietic acid in 100 ml. of 95% ethanol containing 5 mg. of erythrosin B (0.02 M in resin acid and 50 mg./l. in dye) was charged to the equipment described in Example 4 above and aerated and irradiated simultaneously. The reaction was followed by the change in specific rotation, the increase in titratable peroxide, and the change in ultraviolet absorption spectrum. After 45 hr. irradiation and aeration, a peroxide analysis indicated the presence of almost two equivalents of peroxide present per mole of resin acid charged. The specific rotation fell during the reaction and leveled off finally at $[\alpha]_D$ —30°. The absorption peak at 241 m$\mu$ characteristic of abietic acid diminished steadily throughout the reaction and at the end of same, no characteristic absorption was observed from 220–320 m$\mu$. The solvent was stripped off under strongly reduced pressure and the abietic photoperoxide dried in vacuo over Drierite; wt. 0.54 g.;

$\lambda_{max.}^{Nujol\ mull}$ 3.05$\mu$ (s)

(O—H absorption); strong and absorption below 220 m$\mu$ ($R_2C=CR—H$); neut. equiv. 374 (calc. for $$C_{20}H_{30}O_2+2O_2=368.4)$$

reduction with an excess of bisulfite destroyed 48% of the peroxide content (ROOR is not reducible by bisulfite while $$ROOH \xrightarrow[\text{(excess)}]{\text{bisulfite}} ROH)$$

The methyl ester of abietic acid photoperoxide was prepared in ether solution employing an excess of diazomethane. This ester was molecularly distillated to give the thermally rearranged product.

The thermally rearranged product, or alcohol, is characterized as follows: $[\alpha]_D^{25}$ —13° (c.=1% in 95% ethanol); high end absorption below 220 m$\mu$ ($R_2C=CR—H$)

$\lambda_{max.}^{Nujol\ mull}$ 2.95$\mu$ (s)

(O—H absorption) essentially no peroxide content.
*Elemental analyses.*—Found: C, 72.1; H, 9.1 (Calcd. for $C_{20}H_{30}O_2+O_2$: C, 72.4; H, 9.3).

EXAMPLE 14

100 ml. of a solution containing 5 mg. of eosin and 0.604 g. of a mixture of resin acids comprised of 40% palustric acid, 40% abietic acid, 14% neoabietic acid and 7% non-conjugated acids in 95% ethanol was oxidized in the manner described in Example 6. Analysis of the solution after 7.0 hours showed it to contain 1.51 milliequivalents of active oxygen and no palustric acid.

EXAMPLE 15

A reaction vessel was constructed of two concentric glass tubes, mounted vertically, the outer tube being 4.28 cm. in diameter and 54 cm. in length and fitted at the bottom with a sintered glass gas inlet and the inner tube being 3.48 cm. in diameter and 55 cm. in length, sealed at its lower end and containing a commercial 15 watt fluorescent tube type lamp. A solution comprised of 5.00 g. of palustric acid, 0.028 g. of rose bengal and sufficient 95% ethanol to give a total volume of 280 ml. was charged to the intertubular space of the reaction vessel. The solution was sparged vigorously with alcohol saturated air and irradiated by the 15 watt lamp for two hours. The reaction temperature was in the range of 25° to 40° C. The destruction of the palustric acid chromophore is shown by the disappearance of the absorption maximum at a wavelength of 266 millimicrons.

| Reaction time, minutes | $\alpha$ at 266 m$\mu$ |
|---|---|
| 0 | 23.6 |
| 20 | 18.3 |
| 40 | 12.5 |
| 60 | 5.5 |
| 80 | 0.6 |
| 100 | 0.6 |
| 120 | 0.6 |

The peroxidic product was recovered by dilution of the alcoholic solution with a large volume of water and extraction into ether. The ether was removed by vacuum distillation, and the peroxide was dissolved in 50 ml. of acetone and precipitated as the 2-amino-2-methylpropanol salt. Recrystallization of the salt three times from acetone gave 2.90 g. of white needles. The peroxide was freed of the amine and crystallized. A fraction of the crystalline peroxide, which melted with decomposition at 116°, showed $[\alpha]_D^{25}$ —70° (2% in ethanol) gave a methyl ester which could be purified by recrystallization from methanol. The purified methyl ester showed $[\alpha]_D^{25}$ —76° (2% in ethanol), melted at 125–126° C., and liberated 1.2 equivalents of iodine per mole of sample in 1 hour in acidic potassium iodide solution. The peroxide was stable toward alkali, showed no selective, ultraviolet absorption between 220 and 320 millimicrons, contained no alcoholic hydroxyl group and was found by analysis to have the composition $C_{21}H_{32}O_4$. The peroxide was therefore the product of 1,4-addition of oxygen to the conjugated dienic grouping in palustric acid, or 7,13-peroxy-$\Delta$8(14)-dihydroabietic acid.

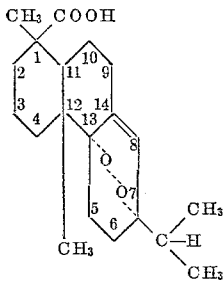

As in Example 1, above, the numbering in the formula is based on Simonsen, "The Terpenes."

EXAMPLE 16

A solution comprised of 2.19 g. of levopimaric acid and 2.0 ml. of tertiary-butyl alcohol was placed in a small glass tube fitted with a sintered glass oxygen inlet, and sparged with oxygen for several hours. The oxidate was taken up in a little ether and the oxidized resin acids were extracted by dilute aqueous sodium hydroxide. The alkaline extract was then acidified by acetic acid and the oxidate was re-extracted into ether solution. Removal of the ether from the oxidate by vacuum distillation left a yellow glassy residue. The oxidate contained 0.014 atom of active oxygen per molecule of resin acid and its ultraviolet absorption spectrum showed maxima at the following wavelengths (millimicrons), with the indicated specific extinction coefficients ($\alpha$) in ethanol solution: 235, $\alpha$ 10.1; 243, $\alpha$ 11.1; 252, $\alpha$ 9.2; 267, $\alpha$ 3.8; 276, $\alpha$ 3.7. The nature of the absorption spectrum shows that the levopimaric acid was oxidized and isomerized to a complex mixture during air oxidation by the free radical autocatalytic mechanism. This illustrates the difference between ordinary autoxidation of rosin acids by the free radical autocatalytic process and the photo-sensitized process of this invention.

While the foregoing examples have shown the photochemical oxidation reaction of this invention applied to the free acids, their methyl esters and their sodium salts, any derivative of the acids in which the double bond structure is unchanged, can be oxidized. For instance the ethyl, propyl, butyl or other alkyl esters or the aryl or aralkyl or hydroxy alkyl esters, or the esters with polyhydric alcohols such as glycerol or ethylene glycol can be oxidized with equivalent results.

EXAMPLE 17

A solution of 43.2 g. of commercial WW grade gum rosin in 2700 ml. of 95% ethyl alcohol (about a 2% solution by weight) containing 0.27 g. of methylene blue (100 mg./l.) was charged to the apparatus described in Example 5 above. The solution was aerated and irradiated simultaneously for 14 hours at which point the ultraviolet absorption of an aliquot of the reaction mixture indicated that the major part (about 90%) of the conjugated diene resin acids had reacted. The photosensitized oxidation was continued for 21 hours and 600 ml. of the reaction mixture removed, treated with activated charcoal, concentrated to 10 ml. under reduced pressure and a solid cyclohexylamine salt prepared by the addition of 6.6 ml. of cyclohexylamine. This salt exhibited no absorption in the 220–320 m$\mu$ 36 region, was insoluble in acetone, water, pet ether, and benzene and soluble in hot alcohol. It gave a strongly positive test for peroxides and initiated the polymerization of acrylic acid when warmed with same.

EXAMPLE 18

A second 600 ml. portion of the final reaction mixture from Example 30 was concentrated to 100 ml. under reduced pressure, 4 g. of sodium hydroxide added, and the alkaline solution refluxed for 15 min. A large excess of water was added and the oily base-rearranged ketonic product was separated, dissolved in acetone, and 8.0 ml. of cyclohexylamine added. The white crystalline amine salt was collected by filtration and dried; yield 4.13 g. It contained a ketone grouping as indicated by a positive chemical test for same and by the presence of an infrared absorption band in the 5.8$\mu$ and 235 m$\mu$ regions. The salt was insoluble in water and benzene and soluble in hot alcohol.

EXAMPLE 19

A solution comprised of 54 g. of WW grade commercial gum rosin and 0.135 g. of methylene blue was dissolved in sufficient 95% ethanol to give a total volume of 1620 ml. (4% rosin by weight) and charged to the large reactor described in Example 5 above. Aeration and irradiation were carried out simultaneously. Solution A was prepared by dissolving 540 g. of WW gum rosin in 320 ml. of 95% ethanol. Solution A was added continuously during the reaction at a rate of about 1 ml. per minute. The addition was discontinued after 520 ml. of solution A had been added. Five hours after the last addition, the ultraviolet absorption spectrum of an aliquot indicated that essentially all of the conjugated diene resin acids had reacted with the exception of abietic acid which had reacted only to a rather low extent. Sixty hours of aeration and irradiation were carried out after the last addition of solution A. The ultraviolet absorption spectrum indicated that essentially all of the abietic acid present had reacted. The perioxide number was found to be 1235. The solution was treated with fuller's earth to remove the dye, concentrated to 400 ml. under reduced pressure, and the product thrown out of solution by the addition of an excess of water. The yield of solid was 276 g. It was insoluble in water, soluble in alcohol, and had a peroxde number of 726.

EXAMPLE 20

To a solution of 0.0732 g. of 18-hydroperoxy-6,14-peroxy-Δ7(8)-dihydroabietic acid in 5 ml. of 95% ethanol was added 5 ml. of a 0.40 M solution of potassium hydroxide in 95% ethanol (10/1 molar ratio of hydroxide/diperoxide). After standing overnight, 2 ml. of water was added followed by conc. hydrochloric acid to pH 1. The solution was refluxed 1.25 hr.; $\lambda_{max}$ 288 m$\mu$, $\alpha=9$; no essential change in ultraviolet spectrum on further refluxing for 0.75 hr. The reaction mixture was vacuum stripped, the residue dissolved in water, extracted with ether, and the ether evaporated. The residue gave a positive phenol test, was insoluble in dilute acid, and water while soluble in alkali, ether, and alcohol. The infrared absorption spectrum exhibited maxima at the following wave lengths: 2.95$\mu$, 3.45$\mu$, 5.65–5.73 (shoulder) $\mu$, 5.90$\mu$, 61.5$\mu$, 7.1$\mu$, 7.27$\mu$ and 7.95$\mu$. The compound on heating in carbon tetrachloride yielded an insoluble carbon-tetrachloride addition complex. The diphenol has the following structural formula.

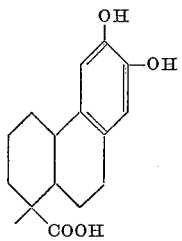

EXAMPLE 21

A solution comprised of 0.242 g. of neoabietic acid and 2.0 mg. of erythrosin B dissolved in 40 ml. of 95% ethanol (0.02 M in resin acid and 50 mg./l. in dye) was charged to a 50 ml. Erlenmeyer flask fitted to a gas burette. The flask was immersed in a constant temperature bath maintained at 26±0.3°. The system was flushed and filled with oxygen in the dark. Magnetic stirring and irradiation with a 15-watt fluorescent lamp were started simultaneously and the reaction followed by means of periodic readings of the volume of oxygen absorbed. Oxygen absorption was essentially complete in 3 hr. with no further oxygen take-up on 30 min. additional irradiation. The sample absorbed 34.8 ml. of oxygen at 26.0° and 760.8 mm. pressure which corresponds to 1.78 moles of oxygen per mole of neoabietic acid.

EXAMPLE 22

A number of dyes, quinones, and diketones were tested for photosensitizing activity with the results as indicated in Table I.

TABLE I

*Testing of compounds as photosensitizers for the photosensitized oxidation of the resin acids*

GROUP A: COMPOUNDS OF RELATIVELY HIGH ACTIVITY

| Compound | Color of the ethanol solution | Percentage resin acid reacted in 1 hr.; resin acid conc. 0.01 M and dye conc. 50 mg./l. | | |
|---|---|---|---|---|
| | | Neo[a] | Levo[b] | PA[b] |
| Rose bengal | Red | 53 | 58 | 64 |
| Erythrosin B | do | 41 | 50 | 54 |
| Methylene blue | Blue | 38 | 46 | 58 |
| Chlorophyll [c] | Green | 34 | 46 | 48 |
| Eosin YS | Orange | 25 | 26 | 26 |
| 9,10-anthraquinone [d] | Essentially colorless | [e] 25 | | |
| Mercurochrome | Orange | 19 | | |
| 1,4-naphthoquinone [f] | Very pale yellow | [g] 10 | | |
| 9,10-phenanthrenequinone [h] | Yellow | [i] 6 [j](5) | | |
| Benzil [k] | Colorless | [l] 4 [j](6) | | |

GROUP B: COMPOUNDS OF BORDERLINE ACTIVITY [m]

(The percentage of neoabietic acid reacted is given in parentheses after the dye)[a]

1,2-naphthoquinone [n] (5); basic fuchsin (5); thymol blue (4); martius yellow (4); p-benzoquinone (3); acridine orange (3); fluorescein (2); biebrich scarlet (2); dimethylglyoxime (2); tartrazine (2); azorubin (1); bromphenol blue (1); benzopurpurin 4B (0); gallocyanin (0); crystal violet (0); acid rosolic (0); benzil monoxime (0); 1,2-naphthoquinone-4-sulfonic acid, sodium salt (0); diacetyl (0); brilliant yellow (0); congo red (0) and auramine hydrochloride (0).

---
[a] The data for neoabietic acid are based on the decrease in $\alpha$ at 251 m$\mu$.
[b] The data for levopimaric and palustric acids are calculated from the overall reaction times reported in J. Am. Chem. Soc., 82, 1734 (1960).
[c] A 4% solution in oil obtained from the Keystone Chemurgical Corporation.
[d] Eastman Kodak sublimed grade.
[e] In 3 hr., 54% reacted.
[f] Found, M.P. 125–126°; Lit. M.P. 125–126°.
[g] In 2 hr., 20% reacted.
[h] Found, M.P. 207–208.5°; Lit. M.P. 206–207.5°.
[i] Solution bleached at 22 min., 0% reacted; 1.0 hr. 6% reacted; 2.0 hr. 11% reacted.
[j] Repeat experiment.
[k] Found, M.P. 95.5°; Lit. M.P. 95°.
[l] At 22 min., 2% reacted; at 1.0 hr. 4% reacted; 2.0 hr. 10% reacted.
[m] The purity of the last three compounds in Group A would indicate that the relatively low order of activity exhibited can probably be ascribed to the compound in question, while the activity of the compounds at the top of the list in Group B might be due to the possible presence of very active impurities.
[n] Eastman Kodak, practical grade, Lit. M.P. 115–120° dec.

EXAMPLE 23

The photosensitized oxidation of neoabietic acid was carried out under essentially identical conditions in methanol, ethanol, and 2-methyl-propanol-2 in the equipment described in Example 4 above. The amount of resin acid reacted after 70 min. was calculated from the decrease in $\alpha$ at 251 m$\mu$ and found to be essentially identical in all cases.

EXAMPLE 24

Photosensitized oxidations of neoabietic acid were carried out in the equipment described in Example 4 above, in which the erythrosin B concentration was varied. The reactions were followed by measuring $\alpha$ at 251 m$\mu$ periodically. The shape of the curve in all cases was found to be the same. The rate at 500 mg./l. was about 10% greater than at 50 mg./l. while the rate at 50 mg./l. was about 140% greater than at 5.0 mg./l.

EXAMPLE 25

Employing the equipment described in Example 4 above and using .02 M solutions of levopimaric, palustric, abietic and neoabietic acids, respectively, in 95% ethanol, it was observed that there was no change in $\alpha$ at $\lambda_{max}$ 251 m$\mu$ nor of $[\alpha]_D$ after 6.0 hr. of each of the following treatments: aeration in the dark, irradiation with visible light, aeration plus irradiation, contact with erythrosin B in the dark, aeration plus erythrosin B in the dark, and irradiation plus erythrosin B. In the last experiment, the air was first swept out of the ethanol solution with nitrogen and the system sealed.

EXAMPLE 26

To a solution of 1.13 g. of 18-hydroperoxy-6,14-peroxy-Δ7(8)-dihydroabietic acid in 20 ml. of chloroform was added 20 ml. of a 0.5 M aqueous sodium phosphate buffer of pH 6.0. Sodium metabisulfite (0.29 g.; 1/1 on a stoichiometric basis) was added with continuous stirring under a nitrogen sweep. After 27 min. all the bisulfite had reacted (aqueous layer did not bleach an iodine solution). Another 0.87 g. of sodium metabisulfite was added (400% excess). The next day, the aqueous layer rapidly bleached on iodine solution and the peroxide content of the chloroform layer was 0.77 mole peroxide/mole of 18-hydroperoxy-6,14-peroxy-Δ7(8)-dihydroabietic acid charged. The aqueous layer was extracted with chloroform and with ether. The organic layers were concentrated to 5 ml. Ether (15 ml.) was added and cyclohexylamine (0.36 ml.; 1/1) added dropwise. The precipitate was ether washed; yield 1.05 g. (75%); $[\alpha]_D^{25}$ +64.3° (c.=0.552). The salt was recrystallized from 95% ethanol-ether, $[\alpha]_D^{27}$ +67° (c.=0.433); no characteristic absorption from 220–320 m$\mu$; $\lambda_{max}$(Nujol mull) 2.87$\mu$ (s), 6.14$\mu$ (s), 8.93$\mu$ (m).

18-hydroxy-6,14-peroxy-Δ7(8)-dihydroabietic acid was regenerated from the salt (0.98 g.) with phosphoric acid. The yield of crude acid was 0.522 g. (68% from salt), $[\alpha]_D^{25}$ +82.3° (c.=0.32); after several recrystallizations from aqueous-methanol, 0.10 g., $[\alpha]_D^{25}$ +98.9° (c.=0.394); M.P. softened at 156° and melted at 161.5° with dec.; peroxide content[37] 0.89 mole peroxide/mole of 18-hydroxy-6,14-peroxy-Δ7(8)-dihydroabietic acid; $\lambda_{max}$ (Nujol mull) 2.90$\mu$ (s), 5.88$\mu$ (s), 8.82$\mu$ (s); $\lambda_{max}$ (CHCl$_3$) 2.75$\mu$ (w), 2.81$\mu$ (m), 2.87$\mu$ (m), 2.96$\mu$ (m), 5.92$\mu$ (s).

*Anal.*—Calcd. for C$_{20}$H$_{30}$O$_5$: C, 68.5; H, 8.6; neut. equiv. 350. Found: C, 68.0; H, 8.9; neut. equiv. 351.

The above data plus the similarity of molar rotations of the 18-hydroxy-6,14-peroxy-Δ7(8)-dihydroabietic acid (M$_D$ +347) thus prepared and the 18-hydroperoxy-6,14-peroxy-Δ7(8)-dihydroabietic acid (M$_D$ +346) starting material show the structural formula of 18-hydroxy-6,14-peroxy-Δ7(8)-dihydroabietic acid to be

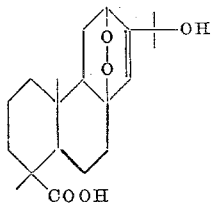

The methyl ester of 18-hydroxy-6,14-peroxy-Δ7(8)-dihydroabietic acid was prepared employing diazomethane in ether. After solvent stripping, the residue was recrystallized from diethyl ether-diamyl ether, yield 0.16 g. (59%); $[\alpha]_D^{26}$ +96.2° (c.=0.266), no change in rotation on further recrystallization from diethyl ether-dibutyl ether. Additional crops of ester raised the total yield to 78%. The pure ester, after drying at 78° and 0.01 mm. pressure over Drierite for 2 hr. exhibited M.P. 169.5–171°; peroxide analysis 0.66 mole peroxide/mole ester; no characteristic absorption from 220–320 m$\mu$, $\lambda_{max}$ (Nujol mull) 2.88$\mu$ (s), 5.82$\mu$ (s).

*Anal.*—Calcd. for C$_{21}$H$_{32}$O$_5$: C, 69.2; H, 8.9. Found: C, 69.3; H, 9.1.

The ester could be sublimed onto a cold finger at about 160–165° and 0.01 mm. without decomposition; sublimate M.P. 169.5–171°.

*Anal.*—Found: C, 68.9; H, 8.8.

EXAMPLE 27

To a solution of 0.500 g. of 18-hydroperoxy-6,14-peroxy-Δ7(8)-dihydroabietic acid in 40 ml. of chloroform was added 40 ml. of a 0.5 M sodium phosphate aqueous buffer solution of pH 6.6. The 2 phase system was well stirred (magnetic stirrer) and a total of 0.195 g. of sodium sulfite (50% excess) added in small portions. After 1.5 hours, the layers were separated, the water layer extracted with chloroform, the chloroform layers combined and 3.0 ml. of 0.92 N aqueous sodium hydroxide added plus 2 ml. of water. The system was well shaken for 30 minutes, the aqueous layer separated and 0.30 ml. of glacial acetic acid added to the aqueous layer. A precipitate of 18-hydroxy-6-keto-14-hydroxy-Δ7(8)-dihydroabietic acid formed, yield 0.31 g. (72% after allowing for aliquots removed during the run); $[\alpha]_D^{26}$ +30.7° (c.=0.52 in 95% ethanol); $\lambda_{max}$ 234 m$\mu$ ($\alpha$=8.8), $\lambda_{max}$ (Nujol mull) 2.98$\mu$ (s), 5.9$\mu$ (s); 6.05$\mu$ shoulder. The structural formula of this compound is

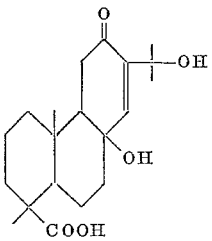

Further evidence for the correctness of this structure is found in the Chem. & Ind. (London) reference cited in Example 9 above.

EXAMPLE 28

A solution of 0.288 g. of neoabietinol [for preparation of same see V. M. Loeblich and R. V. Lawrence, J. Am. Chem. Soc., 79, 1497 (1957)] and 5 mg. of erythrosin B in 100 ml. of 90% ethanol was charged to the reactor described in Example 4 above and irradiation and aeration was carried out simultaneously for 5 hours after which no further change in specific rotation was noted. The solvent was stripped off under reduced pressure and the residual crude diperoxide was recrystallized from aqueous ethanol. The alcoholic peroxide exhbitied a peroxide content of 1.5 moles peroxide/mole of 18-hydroperoxy-6,14-peroxy-Δ7(8)-dihydroabietinol; it exhibited no characteristic absorption in the 220–320 m$\mu$ range; $[\alpha]_D^{25}$ +98° (c.=1.0 in 95% ethanol); exhibited a very strong —OH band at 2.88$\mu$; had a neutral equivalent of zero; and initiated the polymerization of styrene on warming with same. The structural formula of this diperoxide is

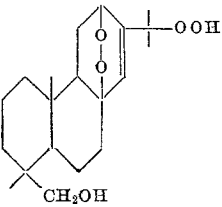

EXAMPLE 29

A solution of 0.316 g. of methyl neoabietate and 5 mg. of rose bengal in 100 ml. of 95% ethyl alcohol was charged to the apparatus described in Example 4 above and was irradiated and aerated for five hours after which time no further change in specific rotation was noted on continued aeration and irradiation. The solvent was stripped off under reduced pressure and the residual methyl ester of neodiperoxide was recrystallized from aqueous methanol. The pure methyl 18-hydroperoxy-6,14-peroxy-Δ7(8)-dihydroabietietate exhibited M.P. 147–147.5° C. with dec. and evolution of gas; $[\alpha]_D^{29}$ +92° (c.=1.0 in 95% ethanol); and peroxide analysis of 1.7 moles peroxide/mole of ester, showing that the product was identical to that prepared in Example 9 above in which 18-hydroperoxy-6,14-peroxy-Δ7(8)-dihydroabetic acid was esterified with diazomethane.

EXAMPLE 30

A solution of 0.328 g. of vinyl neoabietate [prepared by the procedure of J. B. Lewis, W. D. Lloyd, and G. W. Hedrick, J. Org. Chem., 25, 1206 (1960)] (reaction of vinyl chloride and the silver salt of neoabietic acid) and 5 mg. of Eosin YS in 100 ml. of 95% ethanol was charged to the apparatus described in Example 4 above and was aerated and irradiated simultaneously for nine hours. The solvent was removed by vacuum stripping and the residual vinyl 18-hydroperoxy-6,14-peroxy-$\Delta7(8)$-dihydroabietate was recrystallized from aqueous methanol. The ester contained 1.6 moles peroxide/mole of ester, $[\alpha]_D^{25}$ $+8.6°$ (c.=1.0 in 95% ethanol), contained no characteristic absorption in the 220–320 m$\mu$ region, contained infrared absorption bands at 2.8 (—OH), 3.4$\mu$, 6.05$\mu$, and 11.3$\mu$ (terminal methylene); was soluble in ethanol, methanol, and acetone; insoluble in water and pet ether.

EXAMPLE 31

A solution of 0.414 g. of n-octyl neoabietate (prepared from n-octyl bromide and the silver salt of neoabietic acid) and 5 mg. of erythrosin B in 100 ml. of 95% ethanol was charged to the reactor described in Example 4 above and aerated and irradiated simultaneously for 5 hours. The alcohol was removed under reduced pressure and the residual n-octyl 18-hydroperoxy-6,14-peroxy-$\Delta7(8)$-dihydroabietate was recrystallized from ethyl alcohol. The product contained 1.7 moles peroxide/mole of ester; exhibited no characteristic absorption from 220–320 m$\mu$; $[\alpha]_D^{26}$ $+69°$ (c.=1.0 in 95% ethanol); exhibited strong infrared absorption band at 2.88$\mu$.

EXAMPLE 32

About 0.5% by weight of each of the following compounds was dissolved in 15 ml. of freshly distilled styrene contained in a test tube, and the tubes were swept with nitrogen, capped with polyethylene stoppers, and were placed in an oven at 100° together with several tubes containing no added initiator, but otherwise treated similarly: 6,14-peroxy-$\Delta^{7,8}$-dihydroabietic acid, 18-hydroperoxy-6,14-peroxy-$\Delta^{7,8}$-dihydroabietic acid, 7,13-peroxy-$\Delta^{8,14}$-dihydroabietic acid, 18-hydroxy-6,14-peroxy-$\Delta^{7,8}$-dihydroabietic acid, 18-hydroperoxy-6-keto-14-hydroxy-$\Delta^{7,8}$-dihydroabietic acid, crude photosensitized oxidized WW gum rosin, and crude photosensitized pine gum. After 4 hr., the blanks were fluid while all of the other solutions were very viscous. After 40 hours, the blanks consist of soft, fluid gels while the tubes containing the above named materials were hard, glass-like, clear, tough polymeric castings.

The experiment described above was repeated employing acrylic acid instead of styrene as the monomer. After 75 minutes the first trace of polymer appeared in the blanks. All of the solutions containing the added initiator were hard, clear, tough, polymeric castings at this point.

The experiment described above was repeated employing methyl methacrylate as the vinyl monomer in place of styrene. After 2 hrs. the first trace of polymer appeared in the blanks, an excess of methanol was then added to the blanks, which were still fluid, and to the runs containing the added initiator, which were viscous and syrupy. A heavy precipitate of insoluble polymer was obtained in all the tubes containing added initiator and only a trace of polymer in the blanks.

EXAMPLE 33

To 15 ml. quantities of a polyester formulation made from a fumaric acid, ethylene glycol, phthalic anhydride polyester dissolved in an equal weight of styrene was added 0.5% by weight of the resin acid derived peroxy compounds listed in Example 32 above. In addition, to a solution of 1/1 styrene/polyester containing 0.5% of 18-hydroperoxy-6,14-peroxy-$\Delta^{7,8}$-dihydroabietic acid was added an equal weight of cobalt nuodex accelerator. The solutions were placed in test tubes, stoppered, and heated in a hot air oven at 120° C. Several tubes containing no added peroxy compounds were also included to serve as blanks. After three hours, the blanks were soft, pourable gels while the solutions containing the added peroxy compounds were all hard, clear, glass-like castings. The toughest casting appeared to be the one containing the neodiperoxide plus the cobalt accelerator.

A solution of the polyester resin in styrene described above containing 3.0% by weight of 18-hydroperoxy-6,14-peroxy-$\Delta^{7,8}$-dihydroabietic acid (neodiperoxide or neoabietic acid diperoxide) and 3.0% by weight of cobalt nuodex accelerator was allowed to stand at room temperature for two days. A hard, clear, glass-like casting was obtained. A tube of the same resin containing no added catalysts was still fluid at the end of this time.

We claim:
1. The methyl ester of 18-hydroperoxy-6,14-peroxy-$\Delta^{7,8}$-dihydroabietic acid.
2. The vinyl ester of 18-hydroperoxy-6,14-peroxy-$\Delta^{7,8}$-dihydroabietic acid.
3. The n-octyl ester of 18-hydroperoxy-6,14 peroxy-$\Delta^{7,8}$-dihydroabietic acid.
4. 9-hydroperoxy-7,13-peroxy-$\Delta^{8,14}$-dihydroabietic acid.
5. 18-hydroperoxy-6,14-peroxy-$\Delta^{7,8}$-dihydroabietic acid.
6. 18-hydroxy-6,14-peroxy-$\Delta^{7,8}$-dihydroabietic acid.
7. 18-hydroperoxy-6-keto-14-hydroxy-$\Delta^{7,8}$-dihydroabietic acid.

References Cited by the Examiner

UNITED STATES PATENTS

| | | | |
|---|---|---|---|
| 1,752,693 | 4/1930 | Ramage | 260—99 |
| 2,013,074 | 9/1935 | Siegel | 260—99 |
| 2,434,643 | 1/1948 | Drake | 260—99 |
| 2,484,841 | 10/1949 | Lorand | 260—99 |
| 2,584,342 | 2/1952 | Goodwin | 260—45.4 |
| 2,895,950 | 7/1959 | Krieble | 260—89.5 |
| 2,996,515 | 8/1961 | Moore et al. | 260—99 |
| 3,042,650 | 7/1962 | Bockstahler | 260—45.4 |
| 3,043,820 | 7/1962 | Krieble | 260—89.5 |

OTHER REFERENCES

Tobolsky et al.: "Organic Peroxides," Interscience, 1954, New York, page 26, 120–122.

WILLIAM H. SHORT, *Primary Examiner.*

HAROLD BURSTEIN, *Examiner.*

J. J. KLOCKO, S. N. RICE, *Assistant Examiners.*